Dec. 5, 1939.　　　L. M. CHRISTENSEN　　　2,182,550
METHOD OF PRODUCING ALCOHOLS
Filed July 9, 1937
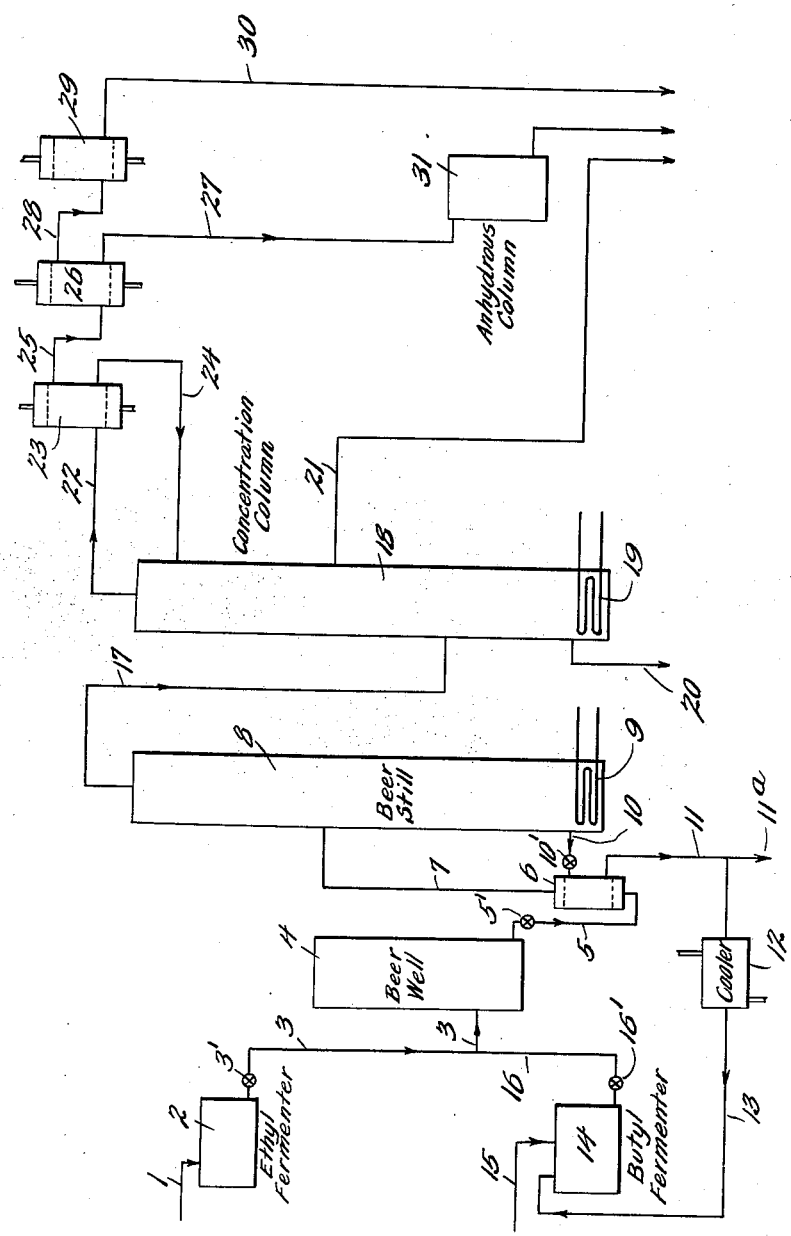
Inventor
Leo. M. Christensen,
By Seward Davis
Attorney Patented Dec. 5, 1939

2,182,550

UNITED STATES PATENT OFFICE 2,182,550

METHOD OF PRODUCING ALCOHOLS

Leo M. Christensen, Atchison, Kans., assignor to The Chemical Foundation, Incorporated, New York, N. Y., a corporation of Delaware Application July 9, 1937, Serial No. 152,671

4 Claims. (Cl. 195—13)

This invention relates to the fermentation of carbohydrates, more particularly to the production of alcohols by fermentation.

As is known, in the typical method of producing alcohol from grains, three essential steps are effected. In the first step the starchy material is subjected to a suitable treatment to produce a gelatinized and liquefied product. In the second step the material is saccharified; that is to say the starch is converted to fermentable sugar. This conversion, in the typical case, is enzymatic and is effected by the use of malt, the conversion, of course, being actually effected by the enzyme of the malt, namely malt diastase. In the third essential step the sugar solution, wort, is treated with yeast to convert the sugar to alcohol.

As known, the temperature, time, hydrogen ion concentration, wort-yeast ratio, and other important factors must be carefully controlled to secure optimum yields. The resulting product, i. e., a beer, is essentially an aqueous alcohol solution containing varying percentages of alcohol, usually between 5% and 8%. As a result of the fermentation, minor amounts of secondary products are formed, such as fusel oils, esters, lower fatty acids, and the like. The major by-products of such a fermentation process are generally considered to be fusel oils, carbon dioxide, and spent grains, the latter containing the residual proteins of the starting material.

In the past the spent grains were usually dried and sold on the market either as cattle food or distiller's grain.

In operating under the older methods the yield of conversion products is much lower than that which is expectable from the quantity of starch originally entering the process. In other words, in the older methods the conversion of grains to alcoholic products and carbon dioxide was not complete. In the typical prior art method the beer-still slop contained appreciable amounts of unconverted carbohydrates which were disposed of in a low-price market. The unconverted carbohydrate content of the slop usually consists largely of dextrins and in typical cases might run as high as 15%, or more, of the original charge. Such residue is, in a sense, a partially converted product and presents a potential value far greater than the actual value received for it in the past.

The present invention, in a broader aspect, relates to a novel process of recovering the full value from such residues.

The concept of utilizing the full potential value of the carbohydrate residues of distillery slop is illustrated herein as embodied in a process in which such residues are subjected to a special fermentation, particularly correlated with the main fermentation step (i. e., the ethyl alcohol fermentation) whereby such residues are converted into valuable alcoholic and ketonic products, severally or conjointly useful in the arts.

The principle of the invention is more specifically illustrated as embodied in a special type of double fermentation for the purpose of producing ethyl alcohol and other fermentation products designed for use as power alcohol. In the special process herein illustrated, therefore, the carbohydrate starting material is substantially quantitatively converted and the conversion products are fully utilized.

A major object of the present invention, therefore, is to convert the residues of alcohol fermentation processes into valuable products.

Another object is to convert distillery slop into valuable by-products.

A further object is to devise an improved fermentation process for converting carbohydrates of fermentation residues into more valuable products.

With these and other equally important objects in view, the invention comprehends the concept of subjecting saccharified starches to fermentation, in any approved manner, to produce ethyl alcohol therefrom and to subject the distillery slop to a special treatment wherein the residual carbohydrates contained in the slop are converted to more valuable organic compounds. The refinements of the invention include the concept of fractionating the conversion products from the two treatments either simultaneously or sequentially in the one distillation apparatus, thus simplifying the plant installation and insuring marked operating economies.

In order to clearly explain the invention, a diagrammatic illustration of a typical plant-unit is shown in the single figure of the accompanying drawing.

To simplify the drawing and description it will be assumed that the starting material for the ethyl alcohol fermentation step is a typical wort produced by any suitable method from any available material. It is to be understood, of course, that in the complete process according to the present invention, the initial starting material is, in fact, any amylaceous substance (i. e., grains, tubers, and the like) and that this is treated in the usual or any approved manner to insure liquefaction and saccharification. The saccharification may be effected by any desired method as, for example, by utilizing malt diastase or taka diastase.

Similarly, it will be assumed that the primary charge to the second or butyl alcohol fermentation stage comprises an unsaccharified mash produced by methods known to those skilled in the art.

The process will be described particularly with reference to the production of power alcohol; that is to say, the production of a product which, in addition to ethyl alcohol, may contain predetermined percentages of by-products of the process which present a high thermal value, such as the higher alcohols and/or predetermined percentages of other by-products, such as acetone, which function beneficially in the ultimate fuel. It is to be appreciated, as will be explained more fully, that by proper control of the operating conditions, aqueous or anhydrous alcohol, free from secondary products, may be produced.

In operating the process, a charge of saccharified mash produced, as noted, in any suitable manner, is charged from a mash tun (not shown) through the line 1 to the ethyl alcohol fermenter 2. In the fermenter the wort is pitched with any suitable yeast, preferably with *Saccharomyces cerevisiae*, in the proper inoculation ratio. In fermenter 2 the temperature and hydrogen ion concentration are carefully controlled, in the manner known to those skilled in the art, to secure efficient fermentation. It will be understood that the carbon dioxide generated during the fermentation is withdrawn and recovered in any suitable form, such as carbon dioxide snow.

At the termination of the ethyl alcohol fermentation, the weak aqueous alcohol product is passed from the fermenter 2 through line 3, controlled by valve 3', to the beer well 4. In the beer well 4 the products produced in fermenter 1 are mixed or commingled with the products of conversion from the butyl alcohol fermenter unit, more particularly to be described. The aqueous solution is withdrawn from the beer well 4, at the times and in the amounts desired, and is passed through valve 5' in line 5 to the heat exchanger 6. In this exchanger the beer is preheated by indirect contact with the hot distillery slop. The preheated beer then passes through line 7 and is discharged at an intermediate point in the beer still 8.

The beer still may be of the usual design and construction, comprising a relatively elongated column in which preliminary concentration is effected by distilling off the alcohol. For this purpose a suitable heating means, such as the closed steam coil 9, is provided in the bottom of the still. The hot aqueous residue or slop containing the unfermented carbohydrates is passed, by way of line 10 and valve 10', to the heat exchanger 6 where it functions to preheat the beer passing to the distillation system and is itself commensurately cooled.

The slop, cooled to some degree in the passage through the heat exchanger, is then passed through line 11 to the cooler 12. In this cooler a suitable cooling medium is utilized and the temperature and speed of flow are so controlled as to reduce the temperature of the slop to approximately the optimum temperature for fermentation; that is to say, to approximately 37° or 38° C. The cooler 12 is preferably thermostatically controlled.

When the butyl beer is being distilled, or at any other time, it is not required or desirable to return the slop to the butyl fermenters. The beer still slops are drawn off through line 11a and taken to the feed recovery unit where the nonfermentable constituents are recovered as byproduct protein feed.

From the cooler 12 the slop or carbohydrate-containing liquor is passed through the line 13 to the butyl fermenter 14. In this fermenter the cooled slop may be treated alone or may be combined with unsaccharified mash fed thereto through the line 15.

In the fermenter 14 the charge is inoculated with a suitable culture, for example, *Clostridium acetobutylicum*. In ordinary operations an inoculation ratio of from one to twenty to one to fifty may be used, employing a 24-hour old transfer. In these circumstances, and operating at a temperature of approximately 38° C., fermentation is normally complete in about 30 hours.

The products of fermentation are withdrawn from fermenter 14 and passed through valve 16' and line 16 to be combined, in the beer well, with the products drawn off from the ethyl alcohol fermenter 2.

With this type of operation, therefore, it will be appreciated that the residue produced in the beer still; that is to say the beer slop, is treated so as to convert the fermentable components of the slop into valuable products. When utilizing *Cl. acetobutylicum*, as will be appreciated, the carbohydrate material is converted into butanol, acetone and ethanol. In ordinary circumstances the material discharged from the butyl fermenter 14 to the beer well contains approximately six parts of normal butanol, three parts of acetone, and approximately one part of ethyl alcohol. Since the main fermentation is carried out in the ethyl alcohol fermenter 2, the alcoholic component of the beer which is subjected to distillation is, of course, largely ethyl alcohol. In normal operations the mixture of butanol, ethanol, and acetone recovered from the butyl fermenter 14 comprises approximately 2% to 3% of the beer in the beer well.

It is to be appreciated that the broad concept of the present invention is the economical utilization of residues heretofore not chemically utilized. While the described method involves the fermentation of such residues, largely to acetone and N-butyl alcohol by *Cl. acetobutylicum*, it is to be appreciated that other microorganisms, capable of converting the carbohydrates into more valuable products, may be employed. For example, if a larger conversion of the initial starting material into ethyl alcohol is desired, the residue or slop may be inoculated with *Bacillus acetoethylicum*. In these circumstances the hydrogen ion concentration may be adjusted and the temperature controlled to produce a maximum yield of ethyl alcohol and a lower yield of the higher alcohols and acetone.

Similarly, by the proper choice of microorganisms, valuable products other than the lower aliphatic alcohols and acetones may be recovered from the beer still residues, as for example, butyric acid, acetic acid, propionic acid, lactic acid, and the like.

It will be seen that the type of process herein described is eminently flexible. The respective quantities of the products to be treated in fermenters 1 and 14 may be varied over wide ranges. Similarly the sequence of the two fermentations may be changed. Depending upon market demands, the process may be operated to produce relatively high or relatively low yields of butanol and acetone, such yields being modified within wide limits by the simple expedient of regulating the amount of the fresh charge fed to fermenter 14 through the line 15.

The economy of the process, as before indicated, is accentuated by simultaneously distilling the fermentation products withdrawn from the two fermenters, and by utilizing available heat in the distillation residues for preheating the charge to fermenter 14. The process thus combines optimum thermal and chemical economies with maximum simplification of equipment.

As has been explained, the respective quantities of fermentation products produced in fermenters 1 and 14 may be greatly varied. In a typical operation for the production of power alcohol, for example, the process may be conducted to produce, in a given cycle, approximately 100 parts by volume of ethyl alcohol beer, in fermenter 2, and from 5 to 25 or more parts by volume of butyl alcohol beer in fermenter 14.

The mixed solution stored in beer well 4, as explained, is preheated by indirect heat exchange with the hot slop and is discharged into the beer still 8. The beer collecting in the kettle of the still is heated by the steam coil 9 and vapors passed overhead, preferably at a temperature in excess of 95° C., through the line 17, to an intermediate point of the concentrating column 18. The hot aqueous residue or slop is passed sequentially through the preheater 6 and cooler 12 to the butyl fermenter 14, wherein the carbohydrate content is converted in the manner described.

Concentration column 18 may be of conventional or any other suitable construction and is utilized to produce an overhead distillate of substantially 190 proof alcohol and an intermediate cut or fraction comprised of the higher alcohols. For this purpose the concentration column is provided with the heating coil 19. The mixed charge entering through line 17 is heated to vaporize the alcoholic and ketonic constituents. The reflux condensate formed on the plates or decks of the column flow downwardly and countercurrently to the stream of evolved vapors, the latter being simultaneously scrubbed by the descending condensate.

At an intermediate point in the column a condensate comprised essentially of amyl and butyl alcohols is withdrawn through the line 21 and passed to a storage vessel. The vaporous mixture reaching the top of the column 18 is comprised of concentrated alcohol in admixture with the acetone content of the charge. Water condensate collected in the base of the column is withdrawn in the usual manner through line 20.

In the preferred practice of the invention the vapors passing overhead from the column 18 are further fractionated to separate the ethyl alcohol from the acetone. After such separation the concentrated aqueous alcohol is passed to a dehydration stage, such as an anhydrous column, to remove the residual water and produce anhydrous alcohol. As will be understood, when the ethyl alcohol produced in the process is to be employed as a fuel it is not essential that the quantitative separation of acetone from the alcohol be effected. On the contrary a small percentage of acetone in the ultimate fuel is sometimes desirable, as for example in those cases where the alcohol is to be blended with gasoline. It is desirable, however, to remove a considerable percentage of the acetone since its presence in large amounts interferes with the dehydration of the ethyl alcohol. Hence the present process may be operated to remove all of the acetone, or to reduce it to a predetermined low percentage, as for example to 1% or less in the alcohol passing to the anhydrous column or other dehydrating unit.

The removal of the acetone contained in the alcohol is effectively secured by fractional condensation, although any other method may be used. As shown, the concentrated, aqueous alcohol-acetone mixture, in vapor phase, is passed from the column 18 through line 22 to the dephlegmator 23. This unit is preferably positively cooled, as by means of water or any other suitable cooling medium. In the dephlegmator 23 an aqueous alcohol condensate is produced and is returned to the upper part of the concentrating tower 18 through the line 24, being thus utilized as a reflux wash for the ascending alcoholic vapors.

Vapors which are uncondensed in the dephlegmator 23 pass through the line 25 into the condenser 26. This condenser, like dephlegmator 23, is preferably positively cooled by circulating a suitable cooling medium therethrough. The temperature conditions within the condenser 26 are accurately controlled so as to preferentially or fractionally condense the aqueous alcohol, while retaining lower boiling point constituents, such as acetone, in the vapor phase. This condenser stage is therefore controlled to reduce the temperature of the incoming vapors below approximately 78.5°, i. e. the boiling point of ethyl alcohol, but above 57° C., i. e. the boiling point of acetone. This temperature control may, if desired, be automatically maintained by means of a suitable thermostatic element operative, for example, to regulate the flow of the cooling medium through the condenser.

The fraction condensed in condenser 26 comprises a 95% aqueous alcohol with, if desired, up to 1% of acetone. This condensate is passed through the line 27 to a suitable dehydrating unit, such as the anhydrous column 31. In this column water may be removed from the alcohol by suitable methods of azeotropic distillation. Instead of passing the condensed aqueous alcohol to an anhydrous column, such alcohol may be treated to remove the water by suitable methods of chemical dehydration, such as is described in U. S. Patent 2,038,357.

The vapors uncondensed in condenser 26 pass off through the line 28 to the final condenser 29. These low boiling point vapors, consisting largely of acetone, are liquefied in the final condenser and are withdrawn through line 30 to storage.

It will be appreciated that with this type of process substantially all of the amylaceous charge is converted into valuable compounds. The ethyl alcohol contained in the beer produced in fermenter 14, as well as that produced in fermenter 2, is simultaneously concentrated and dehydrated. Similarly the fusel oil content of the beer from fermenter 2 is co-distilled and co-condensed with the butyl alcohol produced in the fermenter 14.

When the alcohol produced by the process is to be employed for power alcohol, in admixture with gasoline, predetermined amounts of the secondary products produced may be utilized. For example, the acetone separated and recovered in the process may be admixed in desired percentages with the alcohol to be blended with gasoline to advantageously modify the characteristics of the ultimate fuel. Again, if desired, the fusel oil fraction drawn off through line 21 may be further fractionated and certain of the fractions, such as the normal butyl alcohol, may also be added in predetermined percentages to the anhydrous alcohol produced, when such is to be employed as power alcohol.

When secondary products, such as butanol, acetone and the like, are not directly utilized by admixture with gasoline, they may, of course, separately and profitably be disposed of in the chemical markets.

While a preferred modification of the invention has been described, it is to be understood that this is given merely to illustrate the fundamental principle of the invention and as typifying other equivalent methods of insuring maximum recovery of valuable products by substantially complete utilization of the amylaceous starting material.

I claim:

1. A method of producing anhydrous alcohol and other valuable products from amylaceous starting materials which comprises fermenting a saccharified amylaceous mash in one fermenter to produce ethyl alcohol; distilling the products of fermentation in a distillation zone to recover a concentrated aqueous alcohol; passing the residue from the distillation zone to a second fermenter and fermenting the carbohydrate content of the residue to produce ethyl alcohol, butyl alcohol and acetone; passing the products of conversion from the second fermenter, together with the products of conversion from the first fermenter, to the said distillation zone for co-distillation therein; fractionating the vapors to recover a concentrated aqueous alcohol free from higher and lower boiling constituents; and subjecting the concentrated aqueous alcohol to dehydration.

2. A method of producing ethyl alcohol and other valuable products from amylaceous starting materials which comprises fermenting a saccharifier amylaceous mash in one fermenter to produce ethyl alcohol; distilling the products of fermentation in a distillation zone to recover a concentrated aqueous alcohol; passing the residue from the distillation zone to a second fermenter and mixing such residue in the fermenter with an amylaceous mash; fermenting the mixture in the second fermenter to produce ethyl alcohol, butyl alcohol and acetone; passing the products of conversion of the second fermenter, together with the products of conversion from the first fermenter, to the said distillation zone for co-distillation therein; and fractionating the distilled vapors to recover a concentrated aqueous alcohol substantially free from higher and lower boiling point constituents.

3. A method of producing alcohol and other valuable products from amylaceous starting material which comprises fermenting a saccharified amylaceous mash in a fermenter with *Saccharomyces cerevisiae* to produce ethyl alcohol therefrom; distilling the products of fermentation in a distillation zone to recover a concentrated aqueous alcohol; passing the residue from the distillation zone to a second fermenter and adding to the residue in such fermenter an amylaceous mash; inoculating the material in the second fermenter with *Clostridium acetobutylicum* to produce ethyl alcohol, butyl alcohol and acetone; passing the products of conversion from the second fermenter, together with the products of conversion from the first fermenter, to the said distillation zone for co-distillation therein; fractionating the distilled vapors to recover a concentrated aqueous ethyl alcohol substantially free from higher alcohols and acetone.

4. A method of producing alcohol and other valuable products from amylaceous starting material which comprises fermenting a saccharified amylaceous mash in a fermenter with *Saccharomyces cerevisiae* to produce ethyl alcohol therefrom; distilling the products of fermentation in a distillation zone to recover a concentrated aqueous alcohol; passing the residue from the distillation zone to a second fermenter and adding to the residue in such fermenter an amylaceous mash; inoculating the material in the second fermenter with *Clostridium acetobutylicum* to produce ethyl alcohol, butyl alcohol and acetone; passing the products of conversion from the second fermenter, together with the products of conversion from the first fermenter, to the said distillation zone for co-distillation therein; fractionating the distilled vapors to recover a concentrated aqueous ethyl alcohol substantially free from higher alcohols and acetone; then subjecting the concentrated aqueous ethyl alcohol to dehydration to produce anhydrous alcohol.

LEO M. CHRISTENSEN.